US008452909B2

(12) United States Patent
Tang et al.

(10) Patent No.: US 8,452,909 B2
(45) Date of Patent: May 28, 2013

(54) USB TRANSACTION TRANSLATOR AND A MICRO-FRAME SYNCHRONIZATION METHOD ADAPTABLE TO AN USB IN ISOCHRONOUS TRANSACTION

(75) Inventors: Jinkuan Tang, Beijing (CN); Jiin Lai, Taipei (TW); Buheng Xu, Beijing (CN); Hui Jiang, Beijing (CN)

(73) Assignee: VIA Technologies, Inc., Taipei (TW)

( * ) Notice: Subject to any disclaimer, the term of this patent is extended or adjusted under 35 U.S.C. 154(b) by 208 days.

(21) Appl. No.: 12/959,277

(22) Filed: Dec. 2, 2010

(65) Prior Publication Data

US 2012/0084471 A1    Apr. 5, 2012

(30) Foreign Application Priority Data

Sep. 30, 2010    (CN) .......................... 2010 1 0512069

(51) Int. Cl.
G06F 13/20        (2006.01)
G06F 13/38        (2006.01)

(52) U.S. Cl.
CPC .................................. *G06F 13/385* (2013.01)
USPC ........................................ 710/313; 710/310

(58) Field of Classification Search
USPC ...................... 710/300–317, 52–57
See application file for complete search history.

(56) References Cited

U.S. PATENT DOCUMENTS

| 6,256,687 | B1 * | 7/2001 | Ellis et al. ...................... 710/71 |
| 6,816,929 | B2 * | 11/2004 | Ueda ............................... 710/56 |
| 7,818,603 | B2 * | 10/2010 | Sisolak et al. .................. 713/600 |
| 8,001,296 | B2 * | 8/2011 | Saito ............................... 710/56 |
| 8,140,882 | B2 * | 3/2012 | Lee et al. ....................... 713/400 |
| 2002/0199053 | A1 * | 12/2002 | Kondoh .......................... 710/310 |
| 2006/0149870 | A1 * | 7/2006 | Sears et al. ...................... 710/71 |
| 2006/0195625 | A1 * | 8/2006 | Hesse .................................. 710/8 |
| 2007/0083685 | A1 * | 4/2007 | Hsu et al. ........................ 710/69 |
| 2009/0240851 | A1 * | 9/2009 | Saito ............................... 710/56 |
| 2011/0093736 | A1 * | 4/2011 | Chiang et al. ................. 713/502 |
| 2011/0119557 | A1 * | 5/2011 | Chen et al. ..................... 714/758 |
| 2011/0219195 | A1 * | 9/2011 | Habusha et al. .............. 711/137 |

OTHER PUBLICATIONS

U.S. Appl. No. 12/959,261, filed Dec. 2, 2010.
U.S. Appl. No. 12/959,299, filed Dec. 2, 2010.
U.S. Appl. No. 12/862,134, filed Aug. 24, 2010.

* cited by examiner

*Primary Examiner* — Raymond Phan
(74) *Attorney, Agent, or Firm* — Stout, Uxa, Buyan & Mullins, LLP

(57) ABSTRACT

The present invention is directed to a universal serial bus (USB) transaction translator and a micro-frame synchronization method. A device interface is coupled to a device via a device bus, and a host interface is coupled to a host via a host bus, wherein the host USB version is higher than the device USB version. At least two buffers configured to store data are disposed between the device interface and the host interface. A controller stores the data in the buffers alternately. A start-of-frame (SOF) counter is used to count the SOF packets, wherein the counting value of the SOF counter is compared to a predefined value. Specifically, the controller resets a SOF timer for sending the SOF packet when the counting value achieves the predefined value or is greater than the predefined value, such that the SOF packet and an isochronous timestamp packet (ITP) from the host are sent at the same time. Further, the controller delays the sending of the SOF packet for a period of time according to the ITP from the host.

12 Claims, 5 Drawing Sheets

USB TRANSACTION TRANSLATOR AND A MICRO-FRAME SYNCHRONIZATION METHOD ADAPTABLE TO AN USB IN ISOCHRONOUS TRANSACTION

CROSS-REFERENCE TO RELATED APPLICATIONS

The entire contents of China Patent Application No. 201010512069.4, filed on Sep. 30, 2010, from which this application claims priority, are incorporated herein by reference.

BACKGROUND OF THE INVENTION

1. Field of the Invention

The present invention generally relates to Universal Serial Bus (USB), and more particularly to a USB 3.0 transaction translator (U3TT) and a micro-frame synchronization method.

2. Description of Related Art

Universal Serial Bus (USB) is a specification of peripheral devices to establish communication between the devices and a host. USB 3.0 was released in 2008, and a USB 3.0 cable is shown in FIG. 1A. In addition to a signal pair D+/D− for USB 2.0 data path, two signal pairs SSTX+/SSTX− and SSRX+/SSRX− are further provided for USB 3.0 SuperSpeed data path.

When a USB 2.0 device is coupled to a USB 3.0 host, communication is performed over the non-SuperSpeed data path D+/D−. The applicant of the present invention discloses a USB 3.0 transaction translator (U3TT) in China Patent Application No. 201010129143.4, the disclosure of which is hereby incorporated by reference. The U3TT 10 as shown in FIG. 1B is coupled between the USB 3.0 host 12 and the USB 2.0 device 14, and is utilized to upgrade the USB 2.0 device to act as a quasi-USB 3.0 device such that data transfer speed can be improved.

USB provides four information transfer types: control transfer, bulk transfer, interrupt transfer and isochronous transfer, among which the isochronous transfer type reserves sufficient bandwidth with guaranteed transfer speed and is commonly used in audio or video data transfer. However, as the isochronous transfer type will not correct errors or retry packets, it cannot guarantee the correctness of transferred data.

As the conventional U3TT stays idle most of the time and the bandwidth usage of the USB 2.0 bus is low when performing IN isochronous transaction, the applicant of the present invention thus discloses an improved U3TT in a co-pending U.S. patent application Ser. No. 12/959,261 entitled "USB Transaction Translator and an Isochronous-IN Transaction Method." In the improved U3TT, two buffers are used to pre-fetch data to improve the bandwidth usage of the USB 2.0 bus. However, as USB 3.0 micro-frame time (which is 125 μs) at the host side is not synchronized with USB 2.0 micro-frame time, some problems occur.

FIG. 2 shows micro-frame timing diagrams at the host side and device side respectively. At the host side, the host sends isochronous timestamp packet (ITP) every micro-frame to announce its micro-frame time. The host may read data from the buffers, e.g., buffer 1 or buffer 2, at any time during the micro-frame time. At the device side, U3TT sends a start-of-frame (SOF) packet to announce its micro-frame time. The U3TT may controllably perform data pre-fetch during half of the micro-frame time such as the first half of the micro-frame time. As shown in FIG. 2, the host and the device may probably access the same buffer (e.g., the buffer 1) at the same time (e.g., the drawn overlapped period), therefore resulting in access conflict. In this example, the micro-frame at the device side may conflict with the preceding micro-frame at the host side.

Moreover, as the host and the U3TT use different clock sources respectively, a period difference may ordinarily exist between them. The period difference may accumulate to be a substantive difference, therefore resulting in a synchronization problem.

In order to overcome the problems mentioned above, a need has arisen to propose an improved transaction translator and a micro-frame synchronization method to alleviate the synchronization problems.

SUMMARY OF THE INVENTION

In view of the foregoing, it is an object of the embodiment of the present invention to provide a USB 3.0 transaction translator and a micro-frame synchronization method, which not only solve the access conflict problem between the device side and the host side but also alleviate the accumulated clock period difference between the host side and the U3TT.

According to one embodiment, a Universal Serial Bus (USB) transaction translator includes a device interface, a host interface, at least two buffers, a controller and a start-of-frame (SOF) counter. The device interface is coupled to a device via a device bus, and a host interface is coupled to a host via a host bus, wherein the host has a USB version higher than the USB version of the device. The buffers are configured to store data, and are disposed between the device interface and the host interface. The controller is configured to store the data in the buffers alternately. The SOF counter is configured to count SOF packets, wherein the controller resets a SOF timer for sending a SOF packet when a counting value of the SOF counter achieves the predefined value, such that the SOF packet and an isochronous timestamp packet (ITP) from the host are synchronously sent at the same time. The controller delays the sending of the SOF packet for a period of time according to the ITP from the host.

According to a micro-frame synchronization method adaptable to an IN isochronous transaction method disclosed in another embodiment, a transaction translator resets a start-of-frame (SOF) timer for sending a SOF packet such that the SOF packet and an isochronous timestamp packet (ITP) from a host are synchronously sent at the same time. Subsequently, the sending of the SOF packet is delayed for a period of time according to the received ITP. A number of the SOF packets are counted to result in a counting value. The counting continues when the counting value does not achieve a predefined value; otherwise, when the counting value achieves the predefined value, the step of resetting the SOF timer is performed over again.

DETAILED DESCRIPTION OF THE INVENTION

Figure 3:
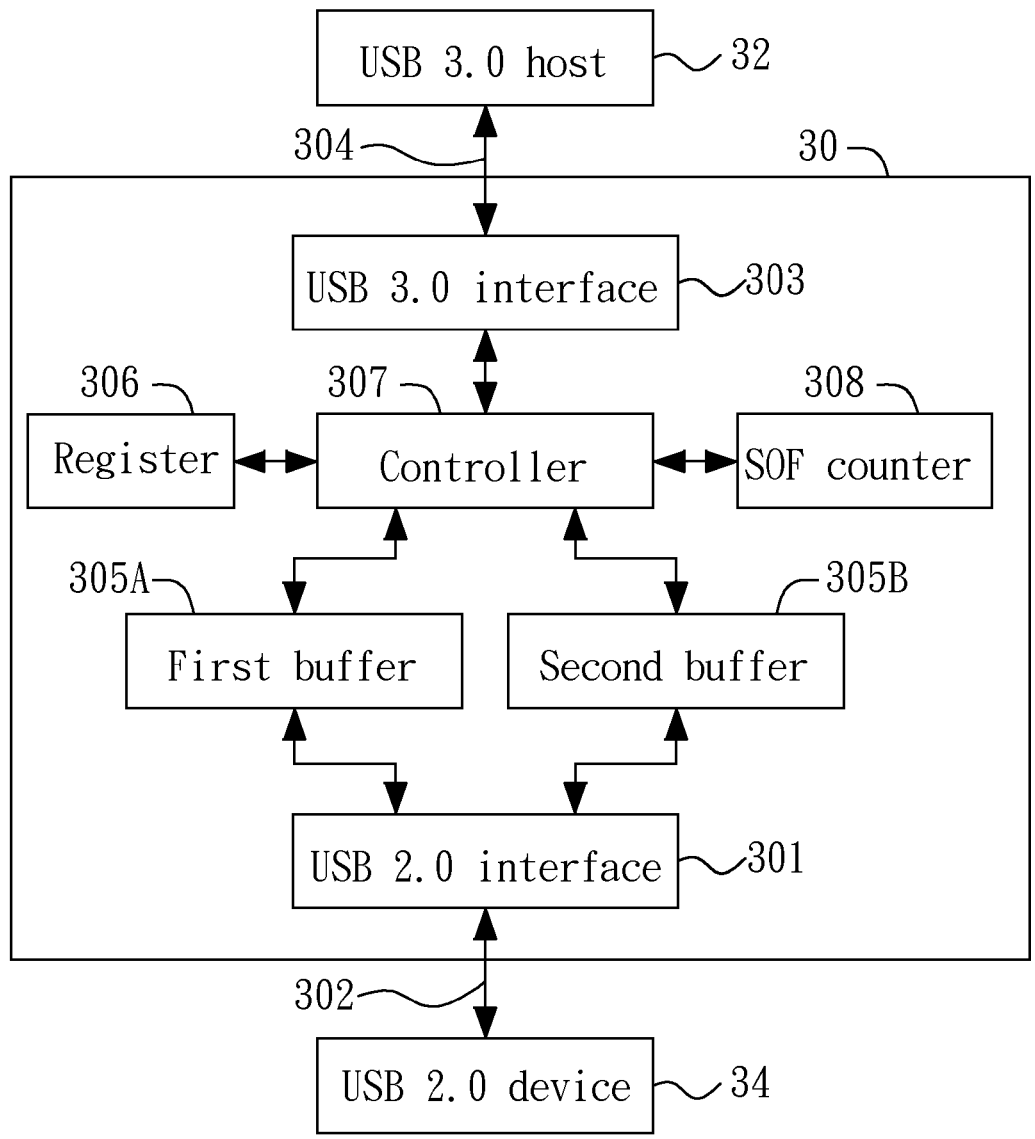
FIG. 3 shows a block diagram illustrated of a Universal Serial Bus (USB) 3.0 transaction translator (U3TT) to establish translation between a USB 3.0 host and a USB 2.0 device according to one embodiment of the present invention.

FIG. 3 shows a block diagram illustrated of a Universal Serial Bus (USB) 3.0 transaction translator (U3TT) 30 to establish translation between a USB 3.0 host 32 and a USB 2.0 device 34 according to one embodiment of the present invention. The configuration of the constituent blocks of the U3TT 30 is not limited to that shown in FIG. 3. Although the USB 3.0 transaction translator 30 is demonstrated here, the present invention, however, may be adapted to a higher USB version. The U3TT 30 as shown in FIG. 3 only illustrates the constituent blocks that are pertinent to the present invention, while details may be referred to the above-mentioned China patent application and co-pending U.S. patent application. Details of USB 2.0 and USB 3.0 may be referred to "Universal Serial Bus Specification" and "Universal Serial Bus 3.0 Specification" respectively, the disclosures of which are hereby incorporated by reference.

In the embodiment, the U3TT 30 includes a USB 2.0 interface (or "device interface") 301, which is coupled to the device 34 via a USB 2.0 bus (or "device bus") 302 that is used as a signal interface between the U3TT 30 and the device 34. The U3TT 30 also includes a USB 3.0 interface (or "host interface") 303, which is coupled to the host 32 via a USB 3.0 bus (or "host bus") 304 that is used as a signal interface between the U3TT 30 and the host 32.

The U3TT 30 includes two buffers: a first buffer 305A and a second buffer 305B, disposed between the USB 2.0 interface 301 and the USB 3.0 interface 303, for storing data. Although two buffers 305A and 305B are demonstrated in the embodiment, a multiple buffering using three or more buffers may generally be applied. Moreover, the first buffer 305A and the second buffer 305B may have different size according to specific applications.

The U3TT 30 may further include a register 306, which is used to record information such as (device addressable) endpoint number or bandwidth requirement of the USB 2.0 bus 302. A controller 307 of the U3TT 30 not only performs translation but also operates and coordinates the other blocks mentioned above.

In the embodiment, the U3TT 30 includes a start-of-frame (SOF) timer (not shown) for sending SOF packets every period of time to announce its micro-frame time. According to one aspect of the present invention, the U3TT 30 includes a start-of-frame (SOF) counter 308, which is used to count the sent SOF packets. The counting value of the SOF counter 308 is compared to a predefined value. The controller 307 resets the SOF timer for sending the SOF packet when the counting value achieves the predefined value or is greater than the predefined value, such that the SOF packet from U3TT 30 and an isochronous timestamp packet (ITP) from the host are synchronously sent at the same time. The accumulated clock period difference problem mentioned above may accordingly be resolved.

Figure 4:
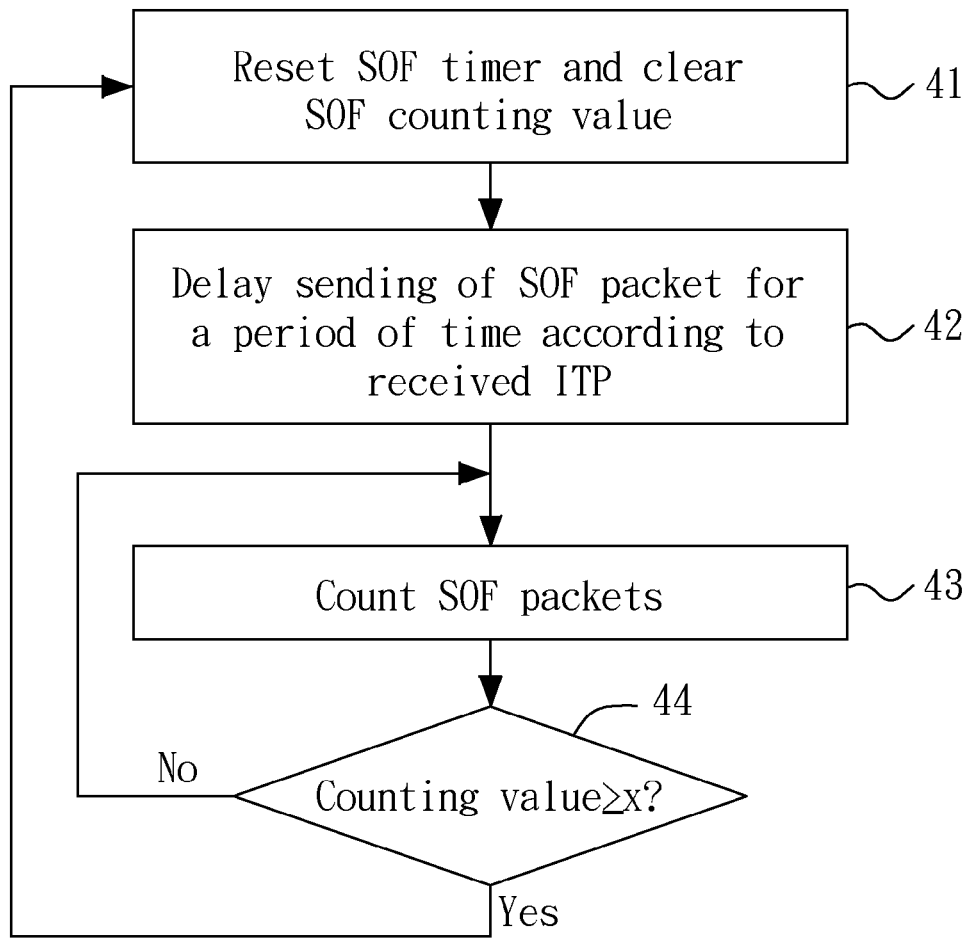
FIG. 4 shows a flow diagram illustrated of a micro-frame synchronization method adaptable to IN isochronous transaction according to one embodiment of the present invention.

FIG. 4 shows a detailed flow diagram illustrated of a micro-frame synchronization method adaptable to IN isochronous transaction according to one embodiment of the present invention. In step 41, the U3TT 30 resets the SOF timer for sending a SOF packet such that the SOF packet and the ITP are sent at the same time. Further, the counting value of the SOF counter 308 is cleared.

Figure 1A:
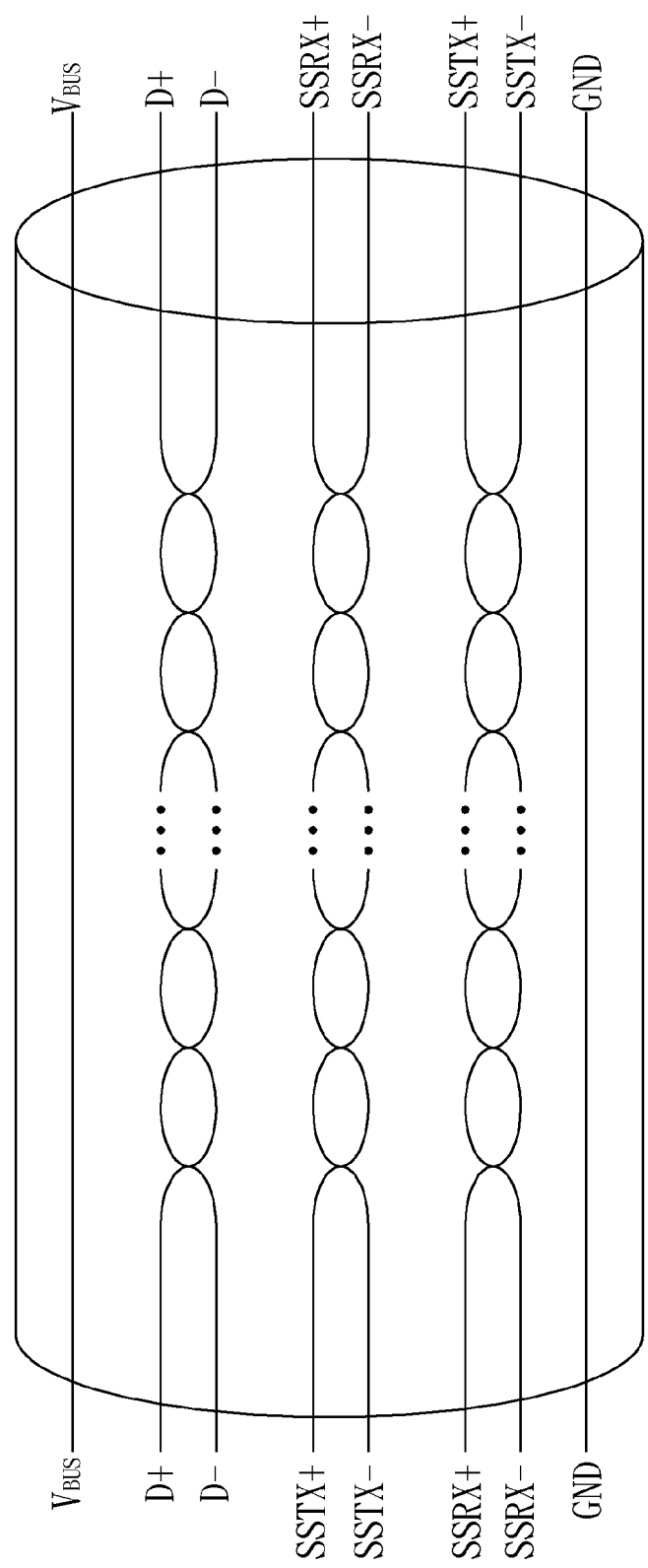
FIG. 1A shows a conventional USB 3.0 cable.
Figure 1B:
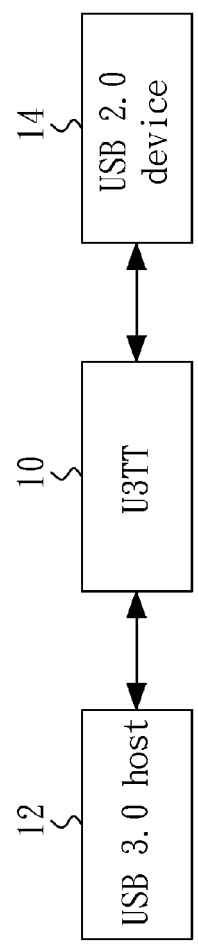
FIG. 1B shows a block diagram illustrating a conventional U3TT coupled between a USB 3.0 host and a USB 2.0 device.
Figure 2:
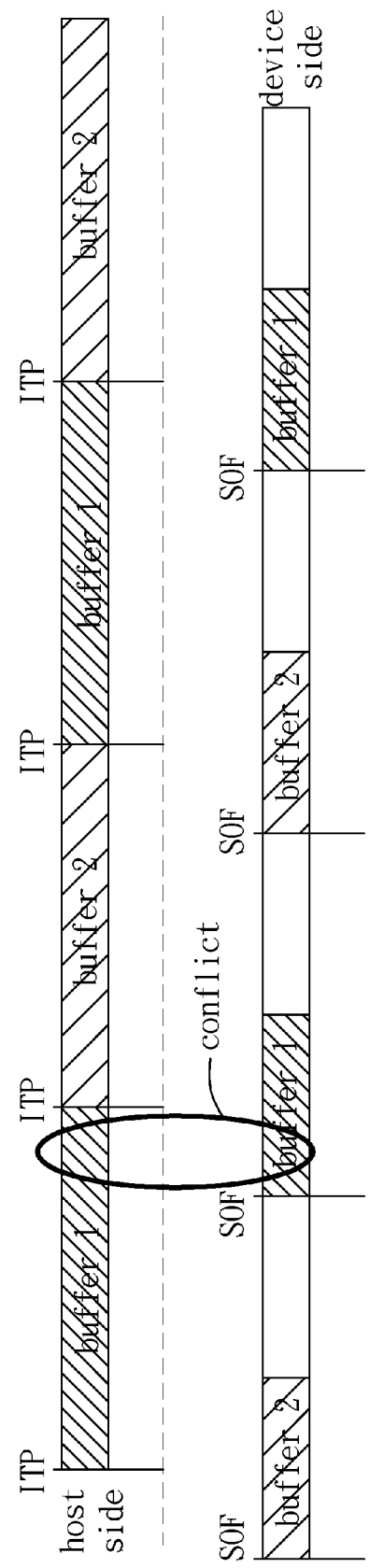
FIG. 2 shows micro-frame timing diagrams at the conventional host side and device side respectively.
Figure 5:
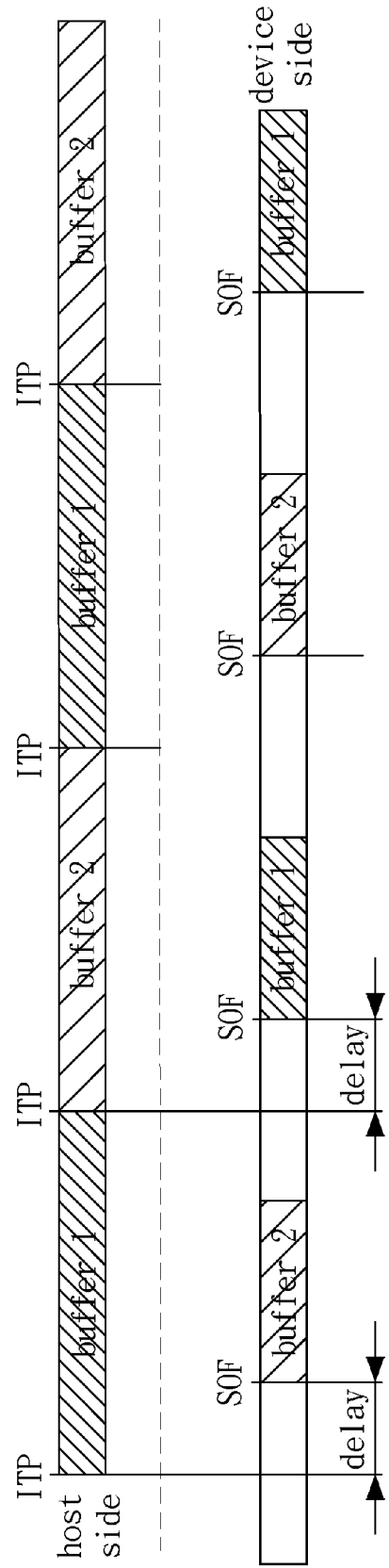
FIG. 5 shows micro-frame timing diagrams at the host side and the device side respectively with delay time.

Subsequently, in step 42, when the U3TT 30 receives the ITP from the host 32, the controller 307 delays the sending of the SOF packet for a period of time according to the received ITP. In general, the delay time is less than one half of the micro-frame time or 62.5 μs, to assure that the USB 2.0 bus 302 accomplishes data transaction within a micro-frame. FIG. 5 shows micro-frame timing diagrams at the host side and the device side respectively with delay time. As shown in the figure, the controller 307 of the U3TT may controllably perform data pre-fetch of the buffers 305A/305B during the first half of each micro-frame. It is observed from FIG. 5 that the delayed micro-frame at the device side no longer overlaps with a preceding micro-frame at the host side as illustrated in FIG. 2.

In step 43, the SOF packets are counted. The SOF counter 308 continues counting when the counting value is not greater than a predefined value x (step 44); otherwise, when the counting value achieves the predefined value x or is greater than the predefined value x, then returns to the step 41, the SOF timer is reset and the SOF counter 308 is cleared. In an extreme case that the predefined value x is set as "1," the SOF timer is reset whenever the ITP is received. In the embodiment, the above-mentioned comparing and clear operations are performed by the controller 307 in the U3TT 30 in the FIG. 3.

Although specific embodiments have been illustrated and described, it will be appreciated by those skilled in the art that various modifications may be made without departing from the scope of the present invention, which is intended to be limited solely by the appended claims.

What is claimed is:

1. A Universal Serial Bus (USB) transaction translator, comprising:
 a device interface coupled to a device via a device bus;
 a host interface coupled to a host via a host bus, wherein the host has a USB version higher than the USB version of the device;
 at least two buffers configured to store data, the buffers being disposed between the device interface and the host interface;
 a controller configured to store the data in the buffers alternately; and
 a start-of-frame (SOF) counter configured to count SOF packets, wherein the controller resets a SOF timer for sending a SOF packet when a counting value of the SOF counter achieves a predefined value, such that the SOF packet and an isochronous timestamp packet (ITP) from the host are synchronously sent at the same time;
 wherein the controller delays the sending of the SOF packet for a period of time according to the ITP from the host.

2. The USB transaction translator of claim 1, when the SOF timer is reset, the controller further clears the counting value of the SOF counter.

3. The USB transaction translator of claim 1, wherein the controller compares the counting value of the SOF counter to a predefined value.

4. The USB transaction translator of claim 1, wherein the USB version of the host is USB 3.0, and the USB version of the device is USB 2.0.

5. The USB transaction translator of claim 1, wherein the delayed period of time is less than one half of USB micro-frame time.

6. The USB transaction translator of claim 1, wherein the controller controllably performs data pre-fetch of the buffers during a first half of each USB micro-frame.

7. The USB transaction translator of claim 1, further comprising a register configured to record information of the device bus, according to which the device performs data pre-fetch.

8. A micro-frame synchronization method adaptable to a Universal Serial Bus (USB) IN isochronous transaction, comprising:

resetting a start-of-frame (SOF) timer for sending a SOF packet such that the SOF packet and an isochronous timestamp packet (ITP) from a host are synchronously sent at the same time;

delaying the sending of the SOF packet for a period of time according to the received ITP; and counting a plurality of the SOF packets, thereby resulting in a counting value;

wherein the counting continues when the counting value does not achieve a predefined value; otherwise, when the counting value achieves the predefined value, the step of resetting the SOF timer is performed over again.

9. The method of claim 8, further comprising a step of clearing the counting value when the SOF timer is reset.

10. The method of claim 8, wherein the delayed period of time is less than one half of USB micro-frame time.

11. The method of claim 8, further comprising a step of performing data pre-fetch from a device during a first half of each USB micro-frame.

12. The method of claim 11, wherein the USB version of the host is USB 3.0, and the USB version of the device is USB 2.0.

* * * * *